United States Patent
Gontowski, Jr.

(10) Patent No.: US 6,504,328 B1
(45) Date of Patent: Jan. 7, 2003

(54) SENSORLESS MOTOR DRIVER WITH BEMF MASK EXTENDER

(75) Inventor: Walter S. Gontowski, Jr., Thompson, CT (US)

(73) Assignee: STMicroelectronics Inc., Carrollton, TX (US)

( * ) Notice: Subject to any disclaimer, the term of this patent is extended or adjusted under 35 U.S.C. 154(b) by 0 days.

(21) Appl. No.: 08/393,706

(22) Filed: Feb. 24, 1995

(51) Int. Cl.[7] .................................................. H02P 7/06
(52) U.S. Cl. ...................... 318/254; 318/254; 318/439; 318/138; 388/928.1
(58) Field of Search .................... 318/138, 439, 318/254; 388/928.1

(56) References Cited

U.S. PATENT DOCUMENTS

| | | | |
|---|---|---|---|
| 5,202,614 A | | 4/1993 | Peters et al. |
| 5,202,616 A | | 4/1993 | Peters et al. |
| 5,233,275 A | * | 8/1993 | Danino ........................ 318/254 |
| 5,258,695 A | * | 11/1993 | Utenick et al. ............. 318/439 |
| 5,258,696 A | | 11/1993 | Le |
| 5,317,243 A | * | 5/1994 | Cameron ..................... 318/254 |
| 5,319,289 A | | 6/1994 | Austin et al. |
| 5,343,127 A | | 8/1994 | Maiocchi |
| 5,414,317 A | * | 5/1995 | Ried et al. ................... 310/239 |
| 5,423,192 A | * | 6/1995 | Young et al. ............... 62/228.4 |

OTHER PUBLICATIONS

IEEE Transactions on Consumer Electronics, vol. 35, No. 3, Aug. 1989, "A Full–Wave Motor Drive IC Based on the Back–EMF Sensing Principle", Bahlmann, p 415–420.

Electronic Components and Applications, vol. 10, No. 3, "Full–wave sensorless drive ICs for brushless DC motors", Dominique Pouilloux, p 2–11.

Proceedings of the Conference on Drives/Motors/Controls 1984, Paraskeva et al., "Microprocessor Control of a brushless DC motor".

Self Synchronization of PM Step and Brushless Motors; A New Sensorless Approach, Antognini et al.

* cited by examiner

Primary Examiner—Robert E. Nappi
Assistant Examiner—Rina I. Duda
(74) Attorney, Agent, or Firm—Lisa K. Jorgenson; Gordon H. Telfer

(57) ABSTRACT

A motor control circuit wherein Bemf zero crossings are sensed to provide phasing information. To avoid incorrect timing (due to detection of zero crossings which may be caused by switching noise when the power transistors switch to commutate other phases), the Bemf detection is masked. Advantageously, the Bemf detection is masked not only for the normal masking period (including an additional percentage beyond the minimum period), but is also for an additional period, if the Bemf output is not of the expected polarity.

33 Claims, 4 Drawing Sheets

SENSORLESS MOTOR DRIVER WITH BEMF MASK EXTENDER

BACKGROUND AND SUMMARY OF THE INVENTION

The present invention relates to methods and circuits for control of sensorless, brushless motors.

Recent years have seen great simplification of DC motors, with corresponding benefits in cost and reliability. Historically most DC motors have used brushes to provide current to the correct phase of the rotor windings, and this persists in motors for consumer products; but for products where reliability and lifetime are needed, electronic commutation is now used. By using semiconductor switches (e.g. FETs) to switch current to the appropriate field winding, the need for replacement of brushes, and the attendant ozone generation, production of conductive dust, and potential for sparking, can be avoided.

Initially electronic commutation was usually accomplished by using some other mechanism to sense the physical position of the rotor. The transducers are typically Hall cells mounted at strategic locations in the motor, in order to provide position information for the commutation circuitry. However, the need for these costly components can be eliminated by obtaining motor position information based on the Bemf of the unenergized (floating) winding.

"Bemf," or back electromotive force, is the voltage induced on a winding, by the changing magnetic field which is present inside the motor, when the winding is not being electrically driven by the external driving circuit. The proximity of a rotor pole contributes to the changes in the magnetic field (due to the magnetic field in the rotor), and therefore the Bemf provides some information about the instantaneous position of the rotor. Even though the magnitude of the Bemf is highly dependent on the specific motor architecture (and possibly also on the load conditions), a change in the SIGN of the Bemf will occur when a rotor pole passes the center of the floating armature coil. Thus detection of zero-crossings in the BEMF can in principle provide adequate information about rotor position.

FIG. 1 depicts the commutation phase sequencing, rotation phase index, output voltage waveforms, and relevant timing signals. The Bemf of the undriven phase of the motor is an accurate and repeatable reference for the motor phase. By differentially monitoring the voltage across the floating phase, the point at which the voltage is zero, or "zero crossing" can be established. With this information, timers (analog or digital) are used to commutate (switch to the next winding phase) at a particular angle, normally 20 to 30 electrical degrees after the zero crossing. As can be seen, there is also a large voltage transition during the commutation due to the flyback current of the motor windings. These flyback pulses also make transitions through zero and could cause erroneous indications of a zero crossing.

In order to prevent the flyback pulses from being detected, a masking circuit is used to block any information from entering the Bemf sensing amplifiers during certain times during the cycle.

One possible approach is exemplified by a motor control chip which is designated the L6238. (Other details of this chip are described in the datasheet available from SGS-Thomson Micro-electronics, and also in copending application Ser. No. 08/140,220, filed Oct. 21, 1993, of common inventorship and assignee with the present application, now patent 5,862,301, issued Jan. 19, 1999. Both of these are hereby incorporated by reference.) In operation, the masking circuitry is enabled as soon as a zero crossing is detected, since any additional information detected after this point is redundant until the next commutation cycle. Referring again to FIG. 1, after the commutation phase delay of typically 30 electrical degrees, the older approach continues to mask out any Bemf information for a time equal to 25% of the previous period. This is indicated by the mask pulse signal in FIG. 1. Thus, the total mask time is equal to the time from the zero crossing to the commutation of the motor plus 25% of the previous period or 45 electrical degrees.

For many applications, this scheme has provided sufficient masking of noise including the commutation pulses. With increasing motor speed and subsequent increase in motor current, the commutation current also increases, resulting in commutation current with a longer duration. In addition, there is a continuing trend of slower slew rates to decrease the electrical and acoustical noise. This also increases the time in which the commutation current is present.

FIG. 2A is a waveform derived from a three phase brushless motor driven by the older approach. The upper waveform is the voltage across one of the phases relative to the center tap of a Y-connected motor winding. The lower trace is the output of the amplifier used to monitor the Bemf voltage. In this situation, the period of the 60 degree electrical cycle is roughly 800 $\mu$s. The masking pulse after commutation therefore is ¼ of this time or 200 $\mu$s. As can be seen, the slew rate of the output has been decreased to a point where the output voltage is below the zero crossing (Center line) when the masking timeout has completed. Therefore, a false zero crossing is detected BEFORE the true zero crossing occurs. This "misfiring" causes the sequencer to be incorrectly clocked, and the motor spins down due to the incorrect phasing.

The disclosed inventions eliminate this problem by continually monitoring the Bemf, to ensure that the correct sign is present before the mask timer is allowed to time out. In operation, the mask is enabled following the Bemf zero crossing as usual. When commutation to the next phase occurs, the mask pulse counter starts counting down to provide for the additional 15 degrees of masking. In the case of FIG. 2A, if the Bemf crosses the zero point, the mask counter stops counting. Once the commutation current is nearly complete and the voltages rises above the zero level, the counter is again enabled to provide an extended masking signal. After the mask counter times out the masking is disabled in anticipation of the true zero crossing.

In order to ensure that the Bemf sensing window is "opened" at the correct time, the scheme described can be modified to continue the mask countdown for some predetermined count, i.e. 7.5 electrical degrees before an improper Bemf polarity can disable the counter.

The invention adds the polarity detector to determine the polarity of the Bemf signal. The polarity of the Bemf now determines whether or not the masking counter is allowed to count, ensuring that the commutation pulse is completely masked out under all conditions.

Many publications have discussed the problems of sensorless brushless DC motor control, including e.g. Pouilloux, "Full-wave sensorless drive ICs for brushless DC motors," 10 ELECTRONIC COMPONENTS & APPLICATIONS 2 (1991); Antognini et al., "Self synchronisation of PM step and brushless motors; a new sensorless approach," in ACTUATOR 90: PROCEEDINGS OF 2ND INTERNATIONAL TECHNOLOGY-TRANSFER CONGRESS at 44 (ed. K. Lenz 1990); Bahlmann, "A full-wave motor drive IC based on the back-EMF sensing principle," 35 IEEE TRANSACTIONS ON CONSUMER ELECTRONICS 415 (1989); Paraskeva et al., "Microprocessor control of a brushless DC motor," in PROCEEDINGS OF THE CONFERENCE ON DRIVES/MOTORS/CONTROLS 84 at 80 (1984); U.S. Pat. No. 5,343,127 of Maiocchi, "Start-up Procedure for a Brushless, Sensorless Motor;" U.S. Pat. No. 5,319,289 of Austin et al., "Adaptive Commutation Delay for Multi-pole Brushless DC Motors;" U.S. Pat. No. 5,202,616 of Peters et al., "Bipolar or Unipolar Drive Back-EMF Commutation Sensing Method;" Duane Hanselman, BRUSHLESS PERMANENT-MAGNET MOTOR DESIGN (1994); and T. J. E. Miller, BRUSHLESS PERMANENT-MAGNET AND RELUCTANCE MOTOR DRIVES (1993); all of which are hereby incorporated by reference.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 2A:
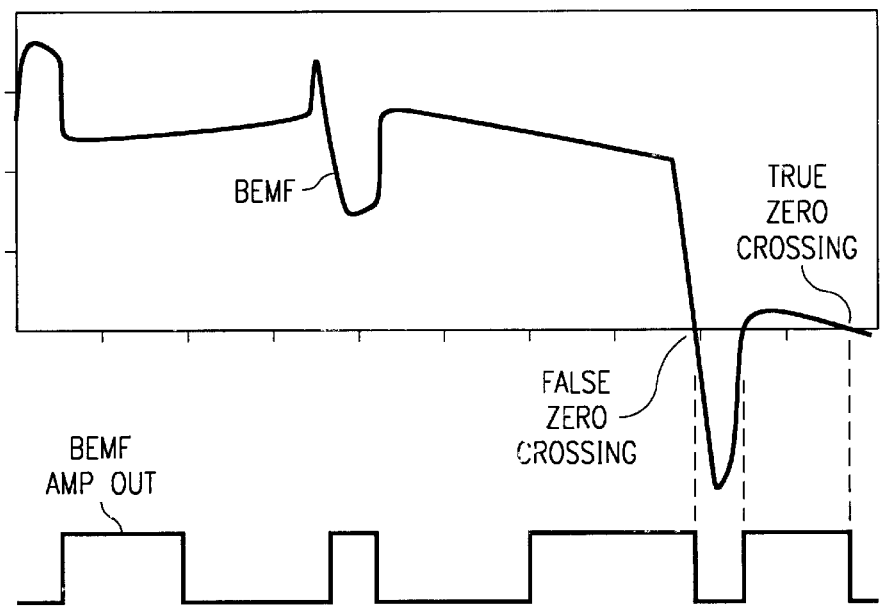
FIG. 2A shows waveforms derived from a three phase brushless motor driven by older techniques.
Figure 3:
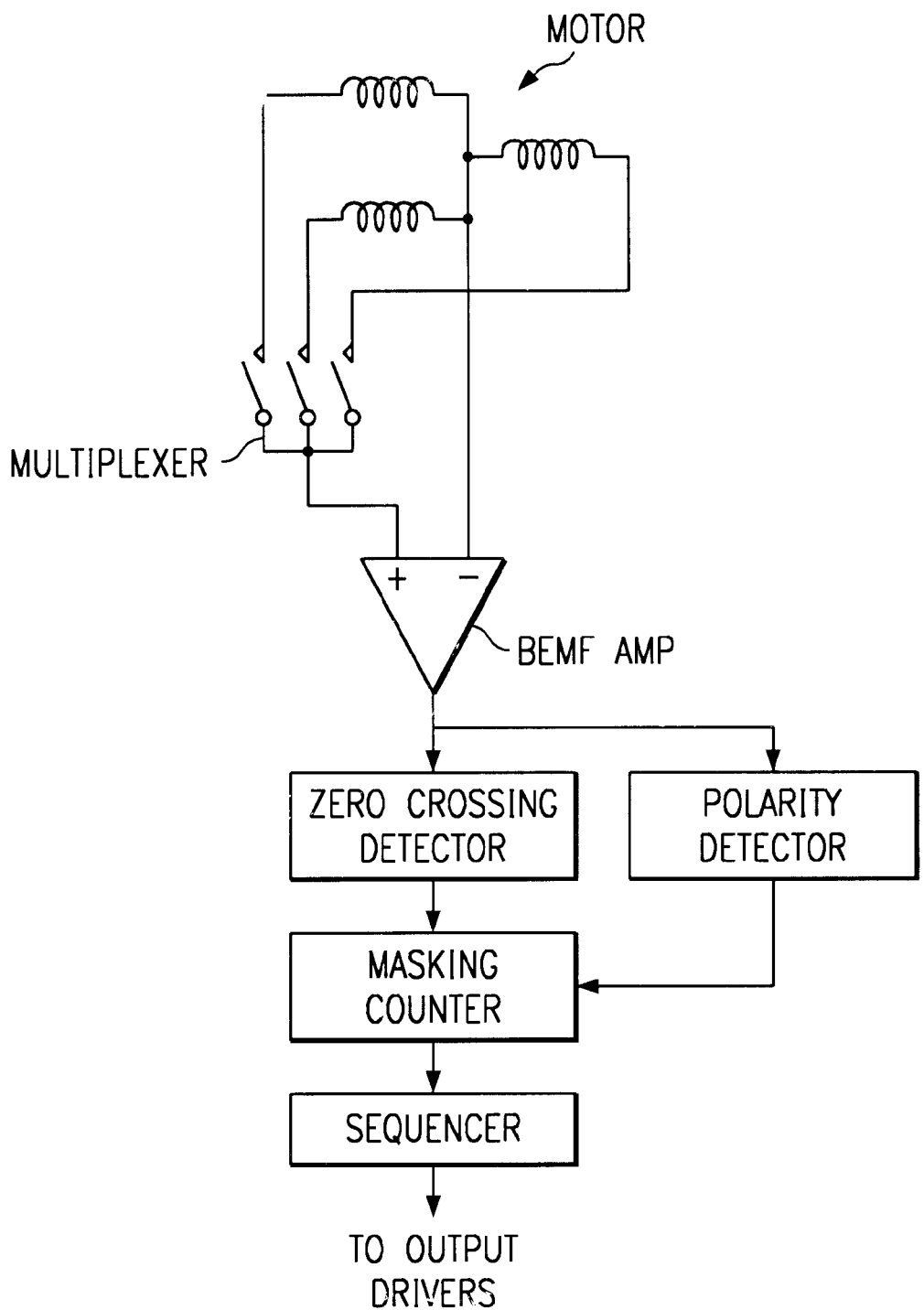
FIG. 3 is a block diagram of a circuit which implements the innovative masking circuitry.

The numerous innovative teachings of the present application will be described with particular reference to the presently preferred embodiment (by way of example, and not of limitation), in which:

FIG. 3 is a block diagram of the invention. The Bemf amplifier monitors the three phases of the motor via a switched multiplexer. The output of the amplifier is directed to a zero crossing detector. The output of the detector is then sent to a masking block that opens a window allowing the zero crossing signal to pass through to the sequencer. As stated, the window closes after passing a normal zero crossing signal through and does not open until 45 electrical degrees later. This simple circuit produces an improvement on the timing relations shown in FIG. 2A, and thereby permits a switching circuit of a given capacity to drive motors which have higher RPM and/or load ratings than would otherwise be possible.

Figure 1:
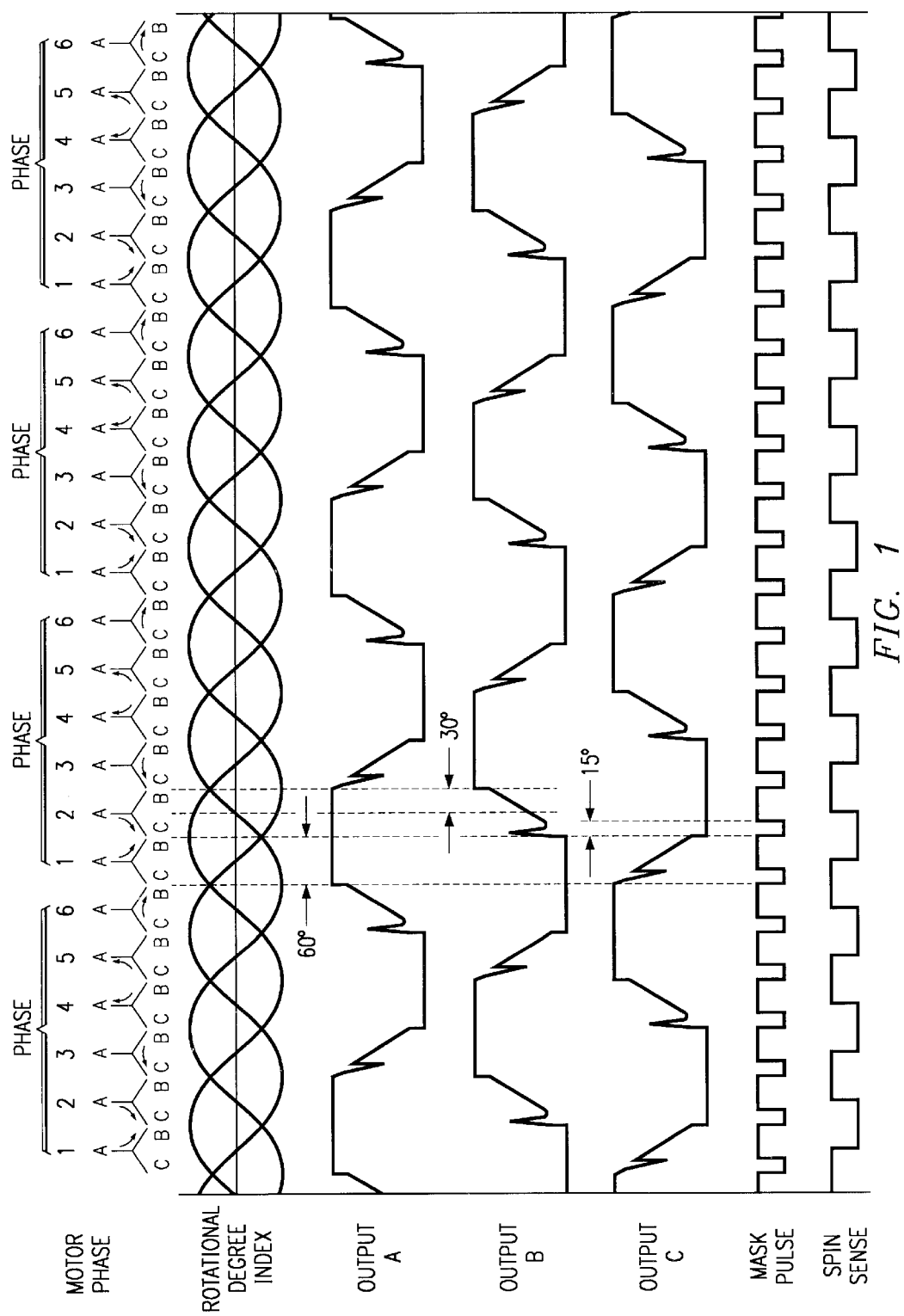
FIG. 1 shows commutation phase sequencing, rotation phase index, output voltage waveforms, and relevant timing signals.

The waveforms of FIGS. 1 and 2A are discussed above. It should be noted that these waveforms are slightly idealized, since there are many noise sources present in a real system.

Figure 2B:
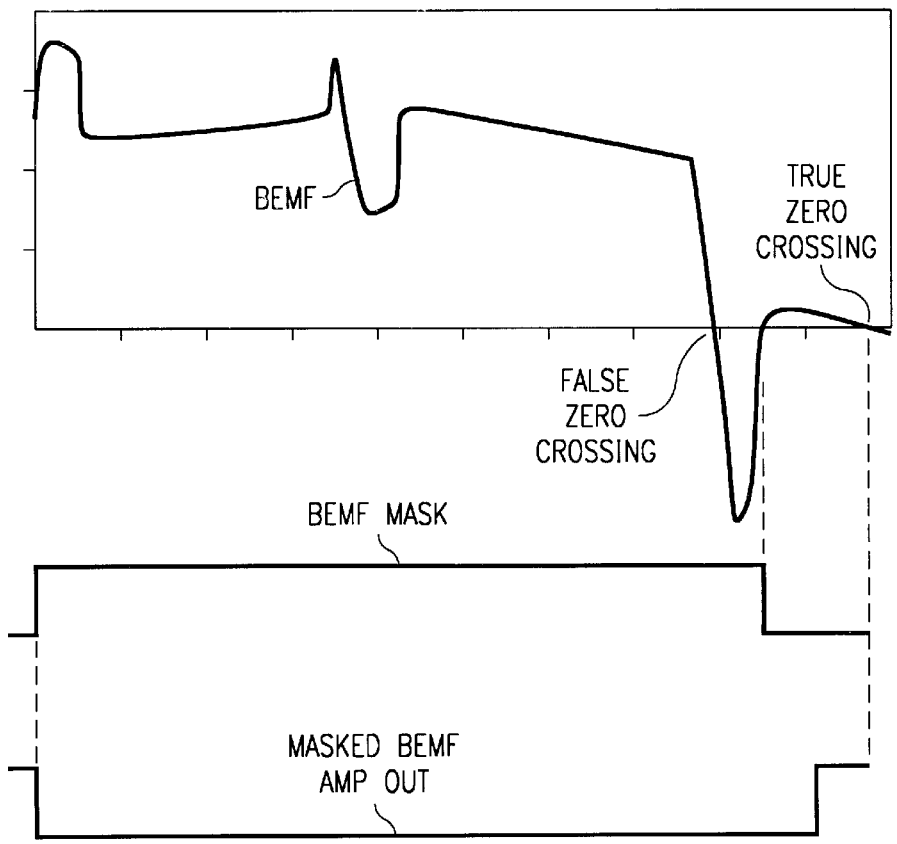
FIG. 2B shows improved waveforms provided by the innovative techniques for driving brushless motors.

FIG. 2B shows improved waveforms provided by the innovative techniques for driving brushless motors. The masking curves shown indicate how the input to the sequencer is masked using the innovative circuits and methods disclosed in the present invention. This avoids the possibility of sensing the false zero crossing which occurs during recovery from a glitch.

Figure 4:
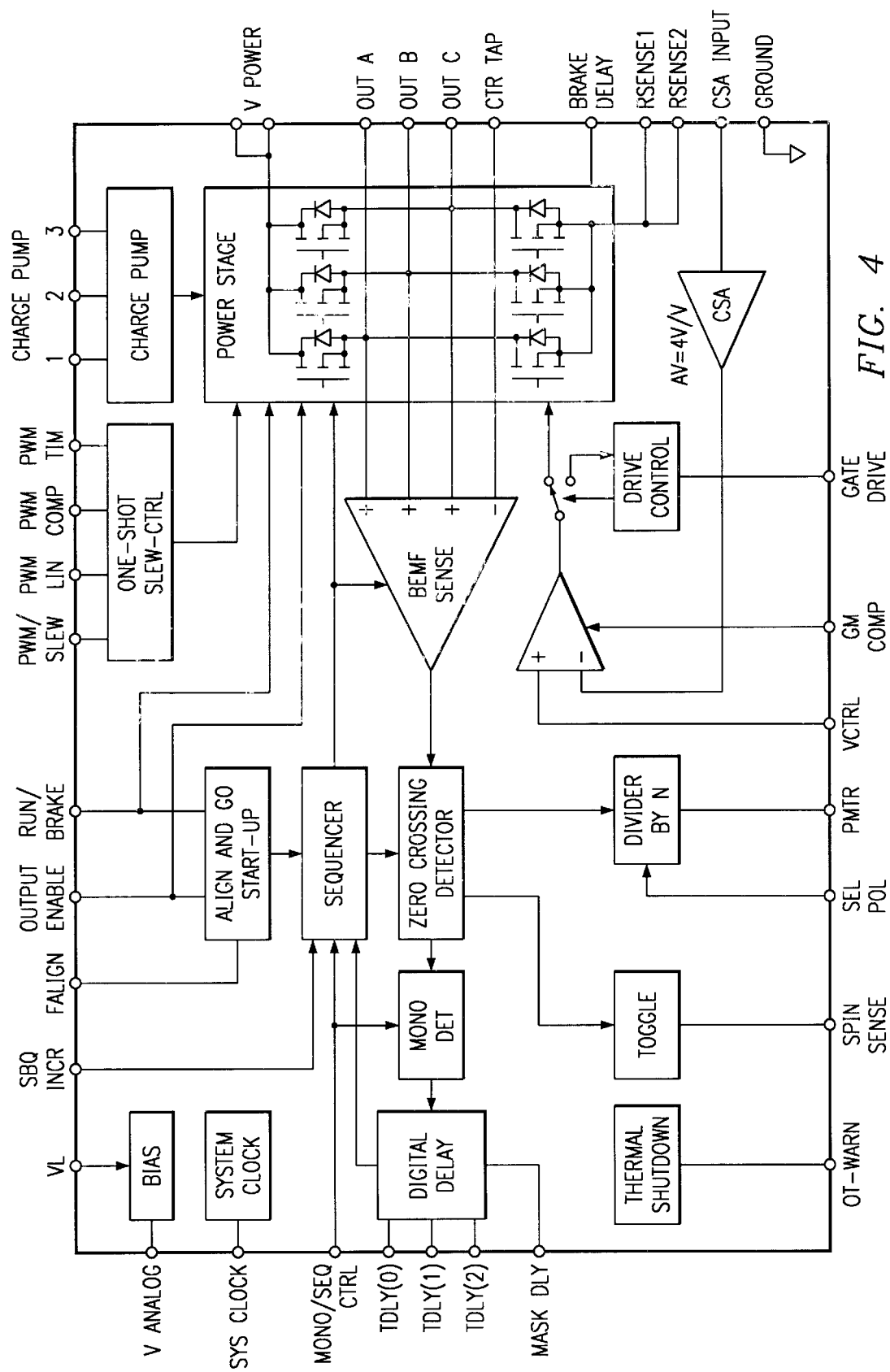
FIG. 4 is a block diagram of a motor driver chip which incorporates the innovative masking circuitry of FIG. 3.

The invention will be used in a product manufactured by SGS-Thomson, designated the L6238S. (This is a modification of the L6238 chip referenced above.) The L6238S is used as a 3-phase, sensorless, brushless spindle motor driver in hard drive memory storage applications. One of the main features of this product is the ability to properly commutate the motor without the need for any position sensor transducers. FIG. 4 is a block diagram of a motor driver chip which incorporates the innovative masking circuitry of FIG. 3.

The illustrated system is a sensorless spindle motor controller which provides a complete three-phase DC brushless spindle motor driver system. A power stage includes integrated three power transistor bridge circuits, driving the three outputs OUT_A, OUT_B, and OUT_C. (In the presently preferred embodiment, this power section can provide 2.5A motor drive. Alternatively, an external linear driver can be added for greater power-or current-handling capacity.) A Bemf sensing amplifier senses the voltage (with respect to the center tap) on whichever leg is floated. The Back EMF amplifier is connected as shown in FIG. 3. (The circuitry of FIG. 3 is schematically indicated by a monotonicity detector (labelled "MONO DET"), which follows the Zero Crossing Detector and input to the digital delay masking. The digital delay, together with external signals, provides inputs to the sequencer which controls the power stage. The foregoing is only a very brief overview, but this chip is described in much greater detail in the attached appendix, which includes a complete L6238S datasheet, and which is hereby incorporated by reference.

According to a disclosed class of innovative embodiments, there is provided: an integrated circuit method for operating a brushless DC motor having a plurality of coil terminals, comprising the steps of: driving ones of the coil terminals, to commute current to sequentially drive multiple phases of motor operation; repeatedly sensing back EMF on whichever one of the terminals is momentarily undriven; for each respective phase of the driving step, masking back EMF for at least a predetermined time after the back EMF first assumes a first polarity; conditionally further masking back EMF, after the predetermined time, for as long as the back EMF is found not to be in the first polarity; performing a masked detection operation to find true zero crossings of the back EMF, using the output of the sensing step as masked by the masking step and the further masking step; detecting motor phase in dependence on the masked detection operation; and controlling the timing of the phases of the driving step in dependence on the detecting step.

According to another disclosed class of innovative embodiments, there is provided: a method for operating a brushless DC motor having a plurality of coil terminals, comprising the steps of: driving ones of the coil terminals, to commute current to sequentially drive multiple phases of motor operation; repeatedly sensing back EMF on a momentarily undriven one of the terminals; for each respective phase of the driving step, masking back EMF for at least a predetermined time after the EMF first assumes a first polarity; conditionally further masking back EMF, after the predetermined time, for as long as the back EMF is found not to be in the first polarity; performing a masked detection operation to find true zero crossings of the back EMF after the predetermined time and the further masking step; detecting motor phase in dependence on the true zero crossing; and synchronizing the phases of the driving step in dependence on the detecting step. According to another disclosed class of innovative embodiments, there is provided: a motor control circuit, for controlling a brushless DC motor having a plurality of coil terminals, comprising: at least one Bemf amplifier which is operatively connected to sense the polarity and zero crossings of back EMF on a respective disconnected one of the coil terminals; a zero-crossing detector which is operatively connected to detect zero-crossings in the output of the Bemf amplifier; a polarity detector which is operatively connected to detect the polarity of the output of the Bemf amplifier; masking circuitry which blocks the output of the zero-crossing detector for a predetermined time after the Bemf amplifier begins to sense the back EMF on the respective one of the coil terminals, and also thereafter for as long as the back EMF has a polarity opposite to that initially present after the Bemf amplifier begins to sense the back EMF on the respective one of the coil terminals, and thereafter permits the zero-crossing detector to communicate zero-crossing events as inputs to a sequencer which controls commutation timing.

According to another disclosed class of innovative embodiments, there is provided: an integrated circuit, comprising: means for driving ones of the coil terminals, to commute current to sequentially drive multiple phases of motor operation; means for repeatedly sensing back EMF on whichever one of the terminals is momentarily undriven; means for masking back EMF, for each respective phase of the driving step, for at least a predetermined time after the back EMF first assumes a first polarity, and for conditionally further masking back EMF, after the predetermined time, for as long as the back EMF is found not to be in the first polarity; means for performing a masked detection operation to find true zero crossings of the back EMF, using the output of the sensing means, as masked by the masking means; means for detecting motor phase in dependence on the masked detection operation; and means for controlling the timing of the phases of the driving step in dependence on the detecting step.

According to another disclosed class of innovative embodiments, there is provided: an integrated circuit, comprising: means for driving ones of the coil terminals, to commute current to sequentially drive multiple phases of motor operation; means for repeatedly sensing back EMF on a momentarily undriven one of the terminals; means for masking back EMF, for each respective phase of the driving step, for at least a predetermined time after the back EMF first assumes a first polarity, and for conditionally further masking back EMF, after the predetermined time, for as long as the back EMF is found not to be in the first polarity; means for performing a masked detection operation to find true zero crossings of the back EMF after the predetermined time and the further masking step; means for detecting motor phase in dependence on the true zero crossing; and means for synchronizing the phases of the driving step in dependence on the detecting step.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For example, the first part of the masking period does NOT have to be defined by a strict timing relationship: various other algorithms can be used instead. Advantages will still be obtained from the innovative teaching of checking the polarity of the BEMF before allowing detection of a zero-crossing.

For another example, the disclosed inventions can also be readily applied to motor driving systems wherein, after startup, the sequencer does not detect Bemf transitions of every floating winding.

For another example, the disclosed inventions can also be readily applied to motor driving systems where at least some phases are driven in wye configuration rather than in delta configuration.

For another example, the disclosed inventions can also be readily applied to motors with more than four stator coils and/or with more than six driving phases.

For another example, the Bemf amplifier, the zero-crossing detector, and the polarity detector can be combined in various ways to achieve the desired functionality, and the specific illustrated circuit configuration is not required.

For another example, the zero-crossing detector and sequencer do not have to be separate as shown, but can alternatively be merged in ways which will still achieve the desired functionality.

For another example, the disclosed inventions can even be applied to motors in which (at least after startup) less than six driving phases are used and/or less than three motor terminals are driven.

APPENDIX

The following appendix pages set forth further specific details of the presently preferred embodiment. This text does not delimit the claimed inventions at all, but is provided merely for superabundant disclosure of the presently contemplated best mode of making and using the invention.

 SGS-THOMSON MICROELECTRONICS

L6238S

12V SENSORLESS SPINDLE MOTOR CONTROLLER

Preliminary Data

FEATURES
- 12V OPERATION
- 3A, THREE-PHASE DMOS OUTPUT (Total Rdson =0.66Ω)
- NO HALL SENSORS REQUIRED
- DIGITAL BEMF PROCESSING
- LINEAR OR PWM CONTROL
- STAND-ALONE OR EXT. DRIVER
- SHOOT-THROUGH PROTECTION
- THERMAL SHUTDOWN

DESCRIPTION

The L6238S is a Three-Phase, D.C. Brushless Spindle Motor Driver. This device features both the Power and Sequence Sections.

Higher Power Applications can be achieved with the addition of an external Linear Driver, or by operating the Internal Drivers in PWM.

Motor Start-Up, without the use of Hall Sensors, can be achieved either by an internal start-up algorithm or by manually sequencing the Output Drivers, using a variety of User-Defined Start-UP Algorithms. Prootection features include Stuck Rotor, Backward Rotation Detection and Automatic Thermal Shutdown

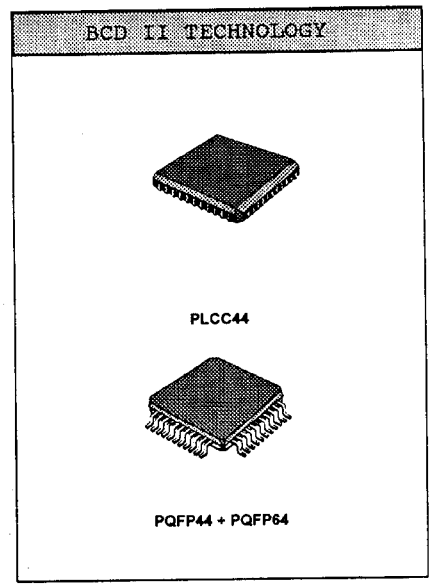

PLCC44

PQFP44 + PQFP64

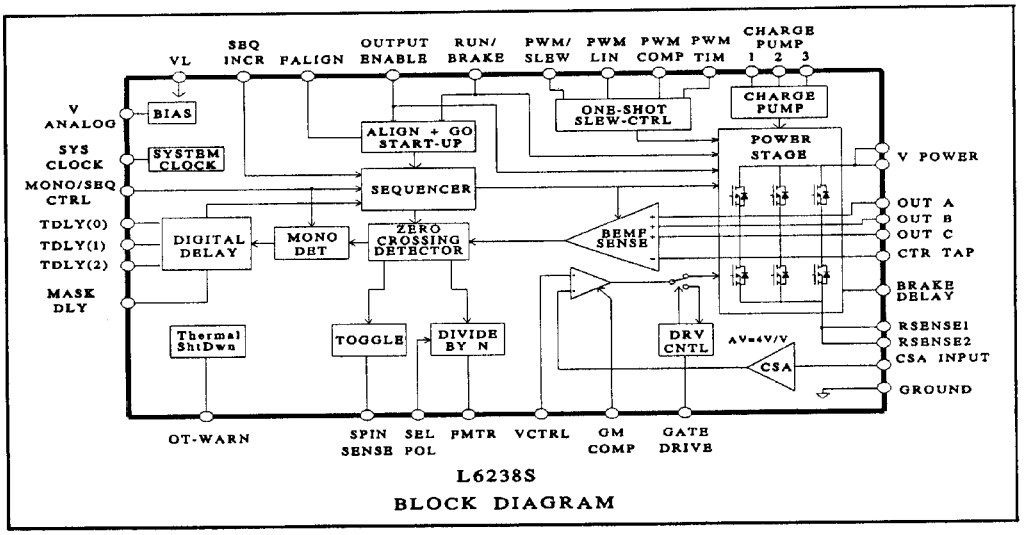

L6238S
BLOCK DIAGRAM

February 22, 1995

ABSOLUTE MAXIMUM RATINGS

| PARAMETER | SYMBOL | LIMITS | UNITS |
|---|---|---|---|
| Output Breakdown Voltage | $BV_{dss}$ | 17.0 | V |
| Motor Supply Voltage | $V_{Power}$ | 15.0 | V |
| Logic Supply Voltage | $V_{Logic}$ | 7.0 | V |
| Analog Supply Voltage | $V_{Analog}$ | 15.0 | V |
| Input Voltage | $V_{In}$ | -0.3 to 7.0 | V |
| Charge Pump Storage Capacitor | $C_{storage}$ | 4.7 | uF |
| Motor Current (DC) (PQFP 64 Only) | $I_{mdc}$ | 3.0 | A |
| Motor Current (DC) (PLCC44&PQFP44) | $I_{mdc}$ | 2.5 | A |
| Peak Motor Current (Pulsed:$T_{on}$ = 5ms,d.c.=10%) | $I_{mpk}$ | 5.0 | A |
| Power Dissipation $T_a = 50°C$ | Pd | 2.5 | W |
| Storage and Junction Temperature | $T_s$ | -40 to 150 | °C |

Thermal Resistance (PLCC 38+6)

| PARAMETER | SYMBOL | MIN TYP MAX | UNITS |
|---|---|---|---|
| Thermal Resistance Junction-Pin | $T_{th(j-pin)}$ | 7.0 | °C/W |
| Thermal Resistance Junction-Amb.(Float.) | $T_{th(j-amb)}$ | 68 | °C/W |
| Thermal Resistance | $R_{th(j-amb)}$ | 34 | °C/W |

Thermal Resistance (PQFP)

| PARAMETER | SYMBOL | MIN TYP MAX | UNITS |
|---|---|---|---|
| Thermal Resistance Junction-Pin | $T_{th(j-pin)}$ | 20.0 | °C/W |
| Thermal Resistance Junction-Amb.(Float.) | $T_{th(j-amb)}$ | 140 | °C/W |
| Thermal Resistance | $R_{th(j-amb)}$ | 60 | °C/W |

ELECTRICAL CHARACTERISTICS Note: All specifications are for $0 \leq T_a \leq 70°C$, $V_A = V_{Pwr} = 12V$, $V_{logic} = 5V$, unless otherwise noted.
Parameters marked with an * are guaranteed by design, but not 100% tested in production.

| PARAMETER | SYMBOL | TEST CONDITIONS | MIN | TYP | MAX | UNITS |
|---|---|---|---|---|---|---|

GENERAL

| Parameter | Symbol | Test Conditions | MIN | TYP | MAX | UNITS |
|---|---|---|---|---|---|---|
| Analog Supply Voltage | $V_{analog}$ | | 10.5 | | 13.5 | V |
| Analog Supply Current | $I_{analog}$ | Run Mode $V_A = 13.5V$ | 1.5 | 2.7 | 4.5 | mA |
| | | Brake Mode $V_A = 13.5V$ | | 280 | 800 | uA |
| Logic Supply Voltage | $V_{logic}$ | | 4.5 | 5.0 | 5.5 | V |
| Logic Supply Current | $I_{logic}$ | Run Mode $V_{logic} = 5.5V$ | 1.0 | 2.0 | 3.2 | mA |
| | | Brake Mode | 100 | 500 | 1000 | uA |

THERMAL SHUTDOWN

| Parameter | Symbol | Test Conditions | MIN | TYP | MAX | UNITS |
|---|---|---|---|---|---|---|
| * Shut Down Temp. | $T_{sd}$ | | | 150 | 180 | °C |
| * Recovery Temp. Hysteresis | $T_{hys}$ | | | 30.0 | | °C |
| * Early Warning Temp. | $T_{ew}$ | | | $T_{sd}-25$ | | °C |

POWER STAGE

| Parameter | Symbol | Test Conditions | MIN | TYP | MAX | UNITS |
|---|---|---|---|---|---|---|
| Output ON Resistance | $R_{DS(on)}$ | $T_j = 25°C, V_A = 10.5V$ | | 0.25 | 0.33 | Ω |
| | | $T_j = 125°C, V_A = 10.5V$ | | | 0.50 | Ω |
| Output Leakage Current | $I_{o(leak)}$ | $V_{pwr} = 15V$ | | | 1.0 | mA |
| Body Diode Forward Drop | $V_F$ | $I_m = 2.0 A$ | | | 1.5 | V |
| Output Slew Rate (Linear) | $dV_o/dt$ | $R_{slew} = 100K\Omega$ | 0.15 | 0.30 | 0.45 | V/us |
| Output Slew Rate (PWM) | $dV_o/dt$ | | 10.0 | | 150 | V/us |
| Gate Drive for Ext. Power DMOS | $I_{gt}$ | $V_{control} = 1V$, $V_{sns}=0V$, $V_A = 10.5V$ | 4.5 | | | mA |
| Ext. Driver Disable Voltage | $V_{Gate-Drive}$ | | | 0.7 | | V |
| Vcontrol Input Range | $V_{Ctrl-Range}$ | | 0.0 | | 5.0 | V |
| Vcontrol Input Current | $I_{in (VCtrl)}$ | | | | 10.0 | uA |

PWM OFF-TIME CONTROLLER $R_{slew} = 100K\Omega$, $C_{off} = 120pF$

| Parameter | Symbol | Test Conditions | MIN | TYP | MAX | UNITS |
|---|---|---|---|---|---|---|
| OFF Time | $T_{off}$ | | 9.0 | 11.0 | 14.0 | us |
| Capacitor Charge Voltage | $V_{chrg}$ | $V_A = 10.5V$ | 2.31 | 2.65 | 3.1 | V |
| * Lower Trip Threshold | $V_{trip}$ | | | 1.25 | | V |

22 February, 1995

| PARAMETER | SYMBOL | TEST CONDITIONS | MIN | TYP | MAX | UNITS |
|---|---|---|---|---|---|---|

PWM LIMIT TIMER

| PARAMETER | SYMBOL | TEST CONDITIONS | MIN | TYP | MAX | UNITS |
|---|---|---|---|---|---|---|
| Capacitor Charge Current | $I_{chrg}$ | $V_{PWM\,Timer}= 0V$, $V_A = 10.5V$ | 10.0 | 20.0 | 30.0 | uA |
| Capacitor Discharge Voltage | $V_{trip}$ | | | 100 | 400 | mV |
| Upper Trip Threshold | $V_{chrg}$ | $V_A = 10.5V$ | 3.0 | 3.5 | 4.0 | V |

BEMF AMPLIFIER

| PARAMETER | SYMBOL | TEST CONDITIONS | MIN | TYP | MAX | UNITS |
|---|---|---|---|---|---|---|
| Center Tap Input Impedance | $Z_{inCT}$ | | 20.0 | 30.0 | 40.0 | KΩ |
| Minimum Bemf (Pk-Pk) | $V_{Bemf}$ | | 60.0 | | | mV |

CURRENT SENSE AMPLIFIER

| PARAMETER | SYMBOL | TEST CONDITIONS | MIN | TYP | MAX | UNITS |
|---|---|---|---|---|---|---|
| Input Bias Current | $I_{snsin}$ | $V_A = 13.5V$ | | | 10.0 | uA |
| Voltage Gain | $G_V$ | | 3.8 | 4.0 | 4.2 | V/V |
| Slew Rate | SR | | 0.33 | 0.8 | | V/us |

BRAKE DELAY

| PARAMETER | SYMBOL | TEST CONDITIONS | MIN | TYP | MAX | UNITS |
|---|---|---|---|---|---|---|
| Capacitor Charge Voltage | $V_{chrg}$ | $R_T = 50K$ | 8.8 | 9.6 | 10.5 | V |
| Input Current | $I_{in}$ | Vin=5.0V | | | 500 | nA |
| Source Current | $I_{out3}$ | $V_A = 10.5V$ | 0.5 | | | mA |
| Delay Timer Low Trip Threshold | $V_{Thres}$ | | 1.2 | 1.8 | 2.8 | V |

CHARGE PUMP

| PARAMETER | SYMBOL | TEST CONDITIONS | MIN | TYP | MAX | UNITS |
|---|---|---|---|---|---|---|
| Storage Capacitor Output Voltage | $V_{out}$ | $V_A = 10.5V$, $I_{out} = 500uA$ | 17.0 | | | V |
| Charge Pump Frequency | $F_{cp}$ | | | 140 | 450 | kHz |
| Vstorage Input Current (Run Mode) | $I_{in}$ | $V_A = 10.5V$, $V_{storage}=20V$ | | | 25 | uA |
| Vstorage Leakage Current (Brake Delay Mode) | $I_{brkdly}$ | $V_{storage} = 12V$, $V_A = V_{logic} = 0V$ | | 0.4 | 1.0 | uA |
| Vstorage Leakage Current (Brake Mode) | $I_{brake}$ | $V_{storage} = 12V$, $V_A = V_{logic} = 0V$ | | 0.1 | 1.0 | uA |

This is advanced information on a new product currently in development or undergoing evaluation. Details are subject to change without notice.

| PARAMETER | SYMBOL | TEST CONDITIONS | MIN | TYP | MAX | UNITS |
|---|---|---|---|---|---|---|

SEQUENCE INCREMENT

| Time Between Rising Edges | $T_{seq}$ | | | 1.00 | | us |
|---|---|---|---|---|---|---|

OUTPUT TRANSCONDUCTANCE AMPLIFIER Note: Measure at OTA Comp. pin.

| Vout High | $V_{oh}$ | $V_A = 10.5V$ | 10.0 | | | V |
|---|---|---|---|---|---|---|
| Vout Low | $V_{ol}$ | | | | 2.0 | V |
| Output Source Current | $I_{source}$ | | | | 40.0 | uA |
| Output Sink Current | $I_{sink}$ | | | | 40.0 | uA |

LOGIC SECTION

| Input Voltage All inputs except Run/Brake | $V_{inH}$ $V_{inL}$ | $4.5V \leq V_{logic} \leq 5.5V$ | 3.5 | | 1.5 | V V |
|---|---|---|---|---|---|---|
| Run/Brake Input Voltage | $V_{inH}$ $V_{inL}$ | $4.5V \leq V_{logic} \leq 5.5V$ | 2.0 | | 1.0 | V V |
| Input Current | $I_{inH}$ $I_{inL}$ | | -1.0 | | 1.0 | uA mA |
| Output Voltage | $V_{outL}$ $V_{outH}$ | $V_{sink} = 2.0mA$ $V_{source} = 2.0mA$ | 4.5 | | 0.5 | V V |
| System Clock Frequency | $F_{sys}$ | | 8.0 | | 12.0 | MHz |
| Clock ON/OFF Time | $T_{on/off}$ | | 20.0 | | | ns |

Phase Delay Truth Table

| Tdelay(2) | Tdelay(1) | Tdelay(0) | Commutation Phase Delay, in Electrical Degrees |
|---|---|---|---|
| 1 | 0 | 1 | 2.0 |
| 1 | 0 | 0 | 9.4 |
| 1 | 1 | 1 | 18.80 |
| 1 | 1 | 0 | 20.68 |
| 0 | 0 | 1 | 22.56 |
| 0 | 0 | 0 | 24.44 * |
| 0 | 1 | 1 | 26.32 |
| 0 | 1 | 0 | 28.20 |

* Input Default

22 February, 1995

SCS-THOMSON MICROELECTRONICS

This is advanced information on a new product currently in development or undergoing evaluation. Details are subject to change without notice.

Fig. 1 - Brake delay timeout vs. $C_{brake}$ ($R_{brake}$ = 1Meg)
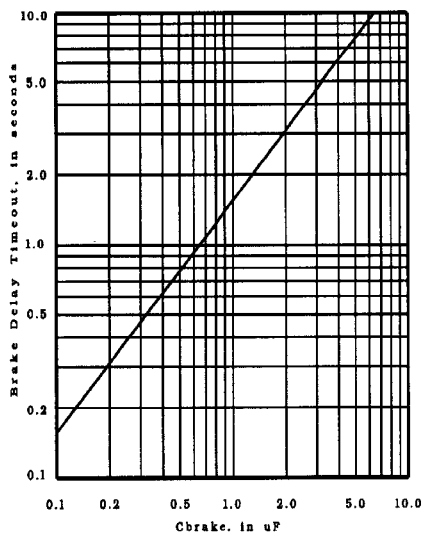
Fig. 2 - Linear slew rate vs. $R_{slew}$
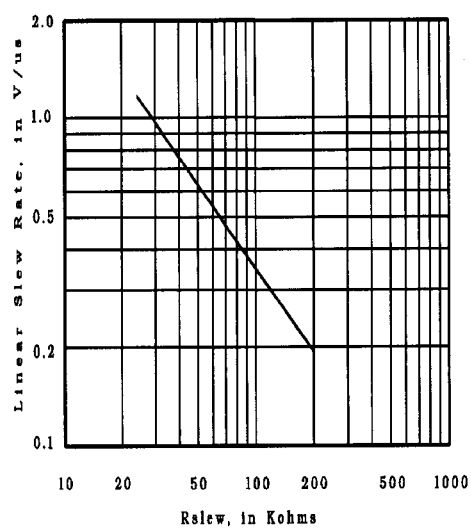
Fig. 3 - PWM Off-time vs. $R_{slew}/C_{off}$
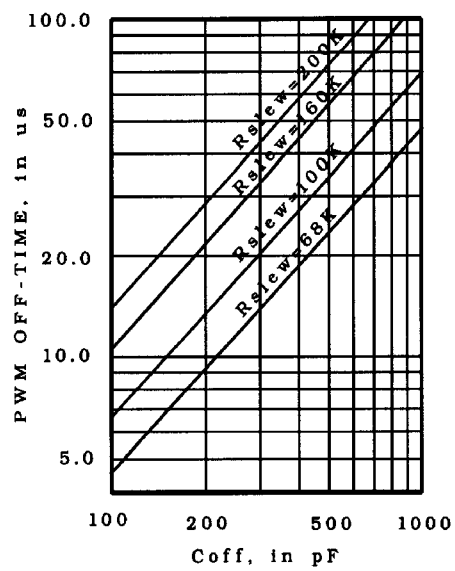
Fig. 4 - PWM limit time-out vs. Ctimer
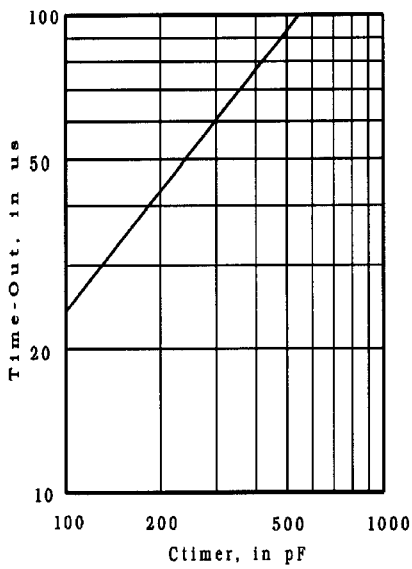

PIN CONNECTION(Top View)
PQFP44 (10 x 10mm)
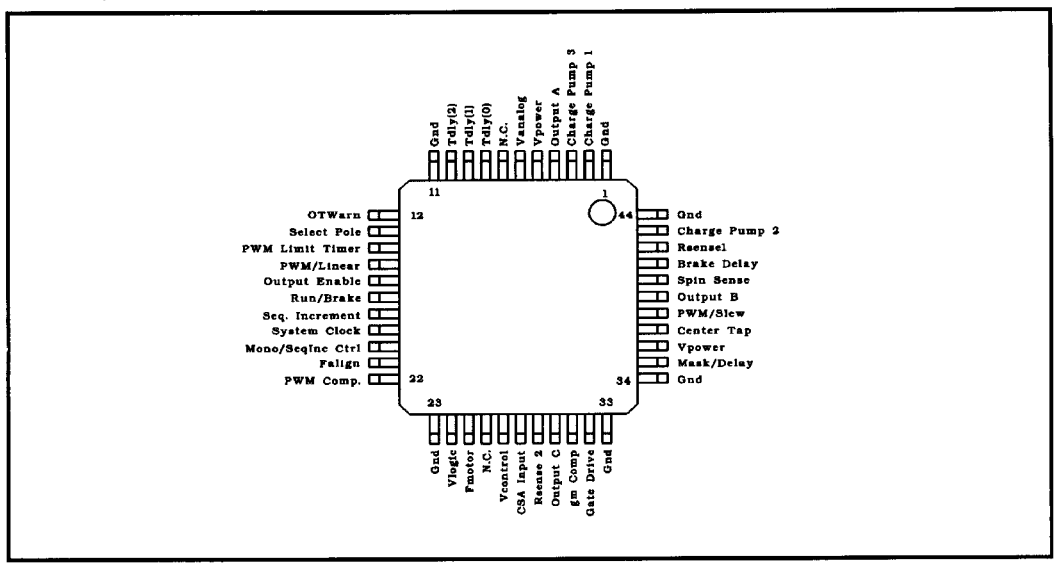
OUTLINE AND MECHANICAL DATA
| DIM. | mm | | | inch | | |
|---|---|---|---|---|---|---|
| | MIN. | TYP. | MAX. | MIN. | TYP. | MAX. |
| A | | | 2.45 | | | 0.095 |
| A1 | 0.25 | | | 0.010 | | |
| A2 | 1.96 | 2.00 | 2.10 | 0.077 | 0.079 | 0.083 |
| B | 0.3 | | 0.45 | 0.012 | | 0.018 |
| C | 0.13 | | 0.23 | 0.005 | | 0.009 |
| D | 12.95 | 13.2 | 13.45 | 0.510 | 0.520 | 0.530 |
| D1 | 9.90 | 10.0 | 10.10 | 0.390 | 0.394 | 0.398 |
| D2 | | 8.00 | | | 0.314 | |
| e | | 0.80 | | | 0.0314 | |
| E | 12.95 | 13.2 | 1345 | 0.510 | 0.520 | 0.530 |
| E1 | 9.90 | 10.00 | 10.10 | 0.390 | 0.394 | 0.398 |
| E2 | | 8.00q | | | 0.314 | |
| F | | 1.60 | | | 0.063 | |
| K | | 0°(min), | 7° (max) | | | |
| L | 0.65 | 0.8 | 0.95 | 0.027 | 0.032 | 0.037 |
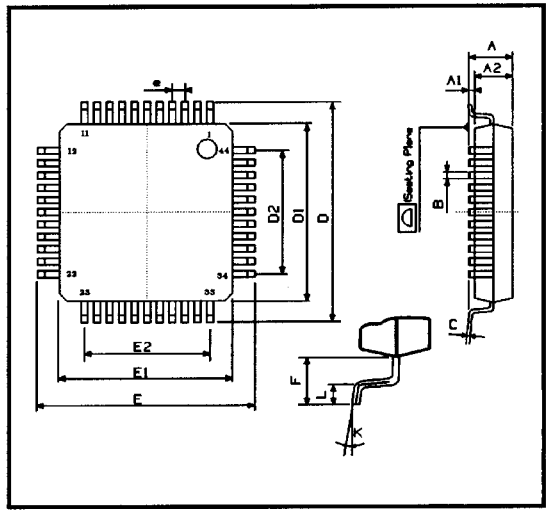
22 February, 1995
This is advanced information on a new product currently in development or undergoing evaluation. Details are subject to change without notice.

PIN CONNECTION(Top View)
PQFP64
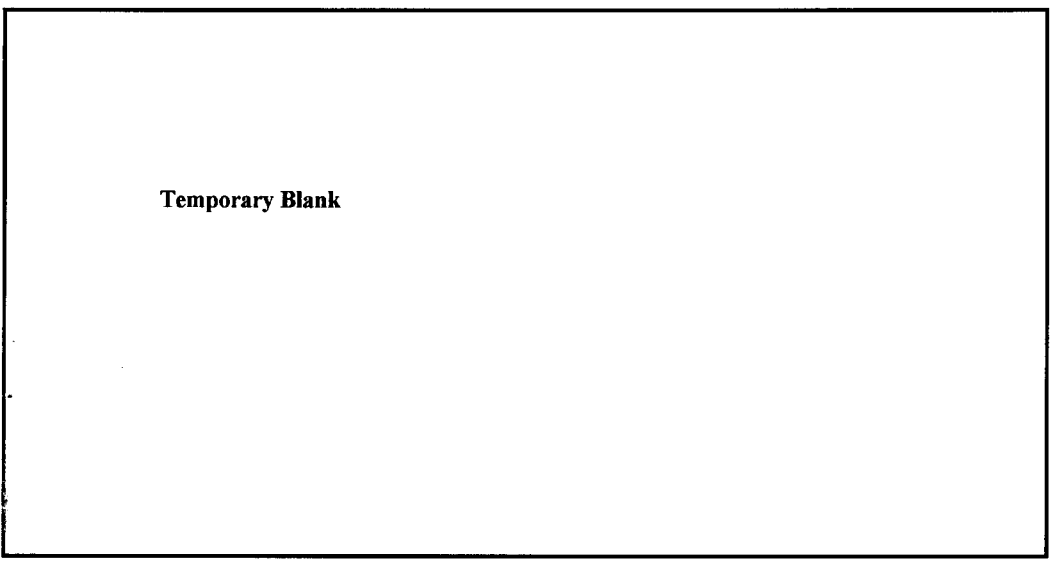
Temporary Blank
OUTLINE AND MECHANICAL DATA
| DIM. | mm | | | inch | | |
|---|---|---|---|---|---|---|
| | MIN. | TYP. | MAX. | MIN. | TYP. | MAX. |
| A | | | 3.40 | | | 0.134 |
| A1 | 0.25 | | | 0.010 | | |
| A2 | 2.55 | 2.80 | 3.05 | 0.100 | 0.110 | 0.120 |
| B | 0.30 | | 0.45 | 0.0118 | | 0.0177 |
| C | 0.13 | | 0.23 | 0.005 | | 0.009 |
| D | 16.95 | 17.20 | 17.45 | 0.667 | 0.677 | 0.687 |
| D1 | 13.90 | 14.00 | 14.10 | 0.547 | 0.551 | 0.555 |
| D2 | | 12.00 | | | 0.472 | |
| e | | 0.80 | | | 0.0315 | |
| E | 16.95 | 17.20 | 17.45 | 0.667 | 0.677 | 0.687 |
| E1 | 13.90 | 14.00 | 14.10 | 0.547 | 0.551 | 0.555 |
| E2 | | 12.00 | | | 0.472 | |
| F | | 1.60 | | | 0.063 | |
| K | | 0°(min), | 7° (max) | | | |
| L | 0.65 | 0.8 | 0.95 | 0.027 | 0.0315 | 0.0374 |
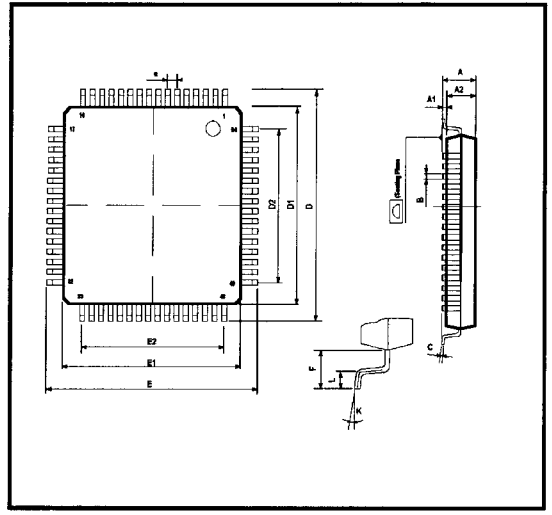

PIN CONNECTION(Top View)
PLCC44
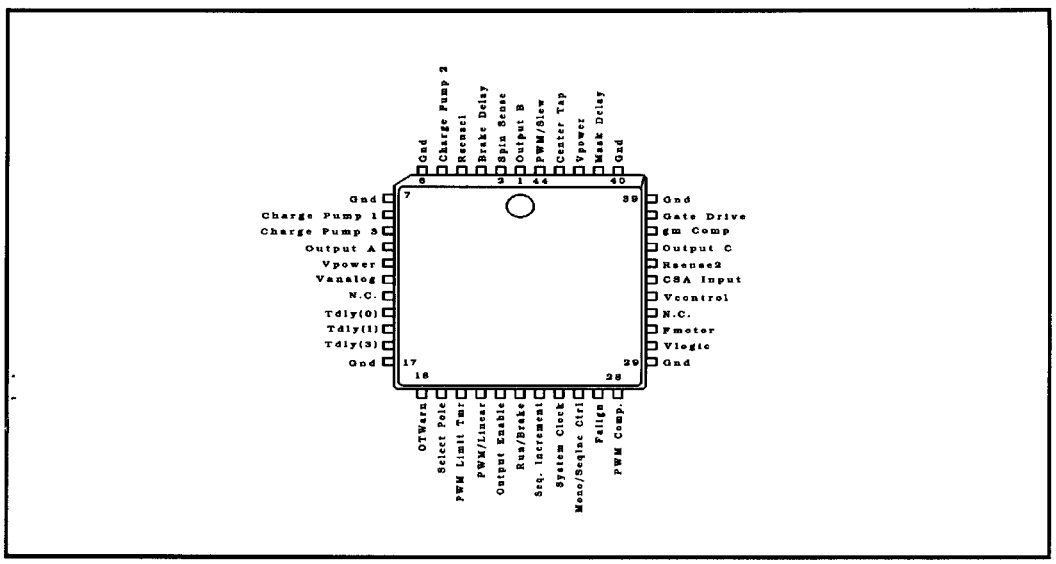
OUTLINE AND MECHANICAL DATA
| DIM. | mm | | | inch | | |
|---|---|---|---|---|---|---|
| | MIN. | TYP. | MAX. | MIN. | TYP. | MAX. |
| A | 17.4 | | 17.65 | 0.685 | | 0.695 |
| B | 16.51 | | 16.65 | 0.650 | | 0.656 |
| C | 3.65 | | 3.7 | 0.144 | | 0.146 |
| D | 4.2 | | 4.57 | 0.165 | | 0.180 |
| d1 | 2.59 | | 2.74 | 0.102 | | 0.108 |
| d2 | | 0.68 | | | 0.027 | |
| E | 14.99 | | 16 | 0.590 | | 0.630 |
| e | | 1.27 | | | 0.050 | |
| e3 | | 12.7 | | | 0.500 | |
| F | | 0.46 | | | 0.018 | |
| F1 | | 0.71 | | | 0.028 | |
| G | | | 0.101 | | | 0.004 |
| M | | 1.16 | | | 0.046 | |
| M1 | | 1.14 | | | 0.045 | |
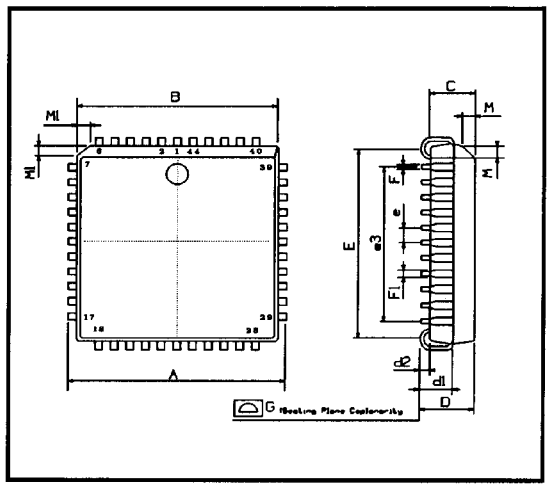
22 February, 1995
This is advanced information on a new product currently in development or undergoing evaluation. Details are subject to change without notice.

PIN DESCRIPTION (* Note: Ground pins for TQFP are: 1-3,15-17,32-34,46-50,63,64)

| PLCC# | PQFP# | TQFP# | Pin Name | DESCRIPTION | Type |
|---|---|---|---|---|---|
| 1 | 39 | 56,57 | Output B | DMOS Half Bridge Output and Input B for Bemf sensing. | I/O |
| 2 | 40 | 58 | Spin Sense | Toggles at each Zero Crossing of the Bemf. | O |
| 3 | 41 | 59 | Brake Delay | Energy Recovery time constant, defined by external R-C to ground. | I |
| 4 | 42 | 60,61 | Rsense1 | Outputs A+B connections for the Motor Current Sense Resistor to ground. | O |
| 5 | 43 | 62 | Charge Pump 2 | Negative terminal of Pump Capacitor. | I |
| 6,7,17, 29,39,40 | 1,11,23, 33,34,44 | * | Ground | Ground terminals. | S |
| 8 | 2 | 4 | Charge Pump 1 | Positive terminal of Pump Capacitor. | I |
| 9 | 3 | 5 | Charge Pump 3 | Positive terminal of Storage Capacitor. | O |
| 10 | 4 | 6,7 | Output A | DMOS Half Bridge Output and Input A for Bemf sensing. | I/O |
| 11,42 | 5,36 | 9,10, 52,53 | Vpower | Power Section Supply Terminal | S |
| 12 | 6 | 11 | Vanalog | 12V supply. | S |
| 13,32 | 7,26 | 8,18,19, 31,41 | N. C. | Open Terminal | NC |
| 14 | 8 | 12 | Tdly(0) | Three bits that set the Delay between the detection of the Bemf zero crossing, and the commutation of the next Phase. | I |
| 15 | 9 | 13 | Tdly (1) | | I |
| 16 | 10 | 14 | Tdly (2) | | I |
| 18 | 12 | 20 | OTWarn | Over-Temperature Warning Output | O |
| 19 | 13 | 21 | Select Pole | Select 4 or 8 Pole Motor Drive. | I |
| 20 | 14 | 22 | PWM Timer | Capacitor connected to this pin sets the maximum time allowed for 100% duty cycle during PWM operation. | I |
| 21 | 15 | 23 | PWM/Linear | Selects PWM or Linear Output Current Control. | I |
| 22 | 16 | 24 | Output Enable | Tristates Power Output Stage when a logic zero. | I |
| 23 | 17 | 25 | Run/Brake | Rising edge will initiate start-up. A Braking routine is started when this input is brought low. | I |
| 24 | 18 | 26 | Sequence Increment | A low to high transition on this pin increments the Output State Sequencer. | I |
| 25 | 19 | 27 | System Clk | Clock Frequency for the system timer/counters. | I |
| 26 | 20 | 28 | Mono/Seq. Inc. Control. | A logic one will disable the Monotonicity Detector and Sequence Increment functions. | I |
| 27 | 21 | 29 | Falign | Reference Frequency for the opt. Auto-Start Algorithm. If int. start up is not used, this pin must be connected to the System Clock. | I |
| 28 | 22 | 30 | PWM Comp. | Output of the PWM Comparator. | O |
| 30 | 24 | 35 | Vlogic | 5V Logic Supply Voltage. | S |
| 31 | 25 | 36 | Fmotor | Motor Once-per-Revolution signal | O |
| 33 | 27 | 37 | Vcontrol | Voltage at this input controls the Motor current | I |
| 34 | 28 | 38 | CSA Input | Input to the Current Sense Amplifier. | I |
| 35 | 29 | 39,40 | Rsense2 | Output C connection for the Motor Current Sense Resistor to ground. | O |
| 36 | 30 | 42,43 | Output C | DMOS Half Bridge Output and Input C for Bemf sensing. | I/O |
| 37 | 31 | 44 | gm COMP | A series RC network to ground that defines the compensation of the Transconductance Loop. | I |
| 38 | 32 | 45 | Gate Drive | Drives the Ext. PFET Gate Driver for Higher Power applications. This pin must be grounded if an external driver is not used. | I/O |
| 41 | 35 | 51 | Mask/Delay | Internal Logic Signals used for Production Testing. | O |
| 43 | 37 | 54 | Center Tap | Motor Center Tap used for differential BEMF sensing. | I |
| 44 | 38 | 55 | PWM/Slew | R/C at this input set the Linear Slew Rate and PWM OFF-Time | I |

What is claimed is:

1. An integrated circuit method for operating a brushless DC motor having a plurality of coil terminals, comprising the steps of:
   (a.) driving ones of said coil terminals, to commute current to sequentially drive multiple phases of motor operation;
   (b.) repeatedly sensing back EMF on whichever one of said terminals is momentarily undriven;
   (c.) for each respective phase of said driving step, masking back EMF for at least a predetermined time after said back EMF first assumes a first polarity;
   (d.) conditionally further masking back EMF, after said predetermined time, for as long as the back EMF is found not to be in said first polarity;
   (e.) performing a masked detection operation to find true zero crossings of said back EMF, using the output of said sensing step (b.) as masked by said masking step (c.) and said further masking step (d.);
   (f.) detecting motor phase in dependence on said masked detection operation; and
   (g.) controlling the timing of said phases of said driving step in dependence on said detecting step.

2. The method of claim 1, wherein said motor has exactly three of said terminals.

3. The method of claim 1, wherein said motor has three of said terminals, and said driving step drives two of said terminals for each phase.

4. The method of claim 1, wherein said motor has a common terminal, and said sensing step (b.) senses voltage of a respective one of said coil terminals with respect to said common terminal.

5. The method of claim 1, wherein a multiplexer is used to select the correct one of said terminals for said sensing step (b.).

6. The method of claim 1, wherein said predetermined time is a constant duration.

7. The method of claim 1, wherein said motor does not provide any position-sensor output other than back EMF voltages on said coil terminals.

8. The method of claim 1, wherein said driving step follows exactly six phases sequentially.

9. The method of claim 1, wherein said driving step uses bridge-connected pairs of integrated power transistors.

10. The method of claim 1, wherein said driving step drives two selected pairs of bridge-connected power transistors at a time, with a polarity which is dependent on the particular phase being driven.

11. A method for operating a brushless DC motor having a plurality of coil terminals, comprising the steps of:
   (a.) driving ones of said coil terminals, to commute current to sequentially drive multiple phases of motor operation;
   (b.) repeatedly sensing back EMF on a momentarily undriven one of said terminals;
   (c.) for each respective phase of said driving step, masking back EMF for at least a predetermined time after said EMF first assumes a first polarity;
   (d.) conditionally further masking back EMF, after said predetermined time, for as long as the back EMF is found not to be in said first polarity;
   (e.) performing a masked detection operation to find true zero crossings of said back EMF after said predetermined time and said further masking step;
   (f.) detecting motor phase in dependence on said true zero crossing; and
   (g.) synchronizing the phases of said driving step in dependence on said detecting step.

12. The method of claim 11, wherein said motor has exactly three of said terminals.

13. The method of claim 11, wherein said motor has three of said terminals, and said driving step drives two of said terminals for each phase.

14. The method of claim 11, wherein said motor has a common terminal, and said sensing step (b.) senses voltage of a respective one of said coil terminals with respect to said common terminal.

15. The method of claim 11, wherein a multiplexer is used to select the correct one of said terminals for said sensing step (b.).

16. The method of claim 11, wherein said predetermine time is a constant duration.

17. The method of claim 11, wherein said motor does not provide any position-sensor output other than back EMF voltages on said coil terminals.

18. The method of claim 11, wherein said driving step follows exactly six phases sequentially.

19. The method of claim 11, wherein said driving step uses bridge-connected pairs of integrated power transistors.

20. The method of claim 11, wherein said driving step drives two selected pairs of bridge-connected power transistors at a time, with a polarity which is dependent on the particular phase being driven.

21. A motor control circuit, for controlling a brushless DC motor having a plurality of coil terminals, comprising:
   at least one Bemf amplifier which is operatively connected to sense the polarity and zero crossings of back EMF on a respective disconnected one of said coil terminals;
   a zero-crossing detector which is operatively connected to detect zero-crossings in the output of said Bemf amplifier;
   a polarity detector which is operatively connected to detect the polarity of the output of said Bemf amplifier;
   masking circuitry which blocks the output of said zero-crossing detector for a predetermined time after said Bemf amplifier begins to sense the back EMF on said respective one of said coil terminals,
   and also thereafter for as long as said back EMF has a polarity opposite to that initially present after said Bemf amplifier begins to sense the back EMF on said respective one of said coil terminals,
   and thereafter permits said zero-crossing detector to communicate zero-crossing events as inputs to a sequencer which controls commutation timing.

22. The integrated circuit of claim 21, further comprising a multiplexer which connects said Bemf amplifier to the disconnected one of said coil terminals.

23. The integrated circuit of claim 21, further comprising a sequencer which is operatively connected to be driven by the output of said masking logic, and which is operatively connected to provide control signals for switching power transistors.

24. The integrated circuit of claim 21, further comprising
   a sequencer which is operatively connected to be driven by the output of said masking logic, and
   multiple bridge circuits, each comprising a respective pair of integrated switching power transistors, connected to be controlled by said sequencer.

25. The integrated circuit of claim 21, connected to exactly three of said coil terminals.

26. An integrated circuit, comprising:

means for driving ones of said coil terminals, to commute current to sequentially drive multiple phases of motor operation;

means for repeatedly sensing back EMF on whichever one of said terminals is momentarily undriven;

means for masking back EMF, for each respective phase of said driving step, for at least a predetermined time after said back EMF first assumes a first polarity, and for conditionally further masking back EMF, after said predetermined time, for as long as the back EMF is found not to be in said first polarity;

means for performing a masked detection operation to find true zero crossings of said back EMF, using the output of said sensing means, as masked by said masking means;

means for detecting motor phase in dependence on said masked detection operation; and means for controlling the timing of said phases of said driving step in dependence on said detecting step.

27. The integrated circuit of claim 26, further comprising a multiplexer which connects said sensing means to the disconnected one of said coil terminals.

28. The integrated circuit of claim 26, further comprising a sequencer which is operatively connected to be driven by the output of said masking means, and which is operatively connected to provide control signals for switching power transistors.

29. The integrated circuit of claim 26, wherein said driving means is connected to exactly three of said coil terminals.

30. An integrated circuit, comprising:

means for driving ones of said coil terminals, to commute current to sequentially drive multiple phases of motor operation;

means for repeatedly sensing back EMF on a momentarily undriven one of said terminals;

means for masking back EMF, for each respective phase of said driving step, for at least a predetermined time after said back EMF first assumes a first polarity, and for conditionally further masking back EMF, after said predetermined time, for as long as the back EMF is found not to be in said first polarity;

means for performing a masked detection operation to find true zero crossings of said back EMF after said predetermined time and said further masking step;

means for detecting motor phase in dependence on said true zero crossing; and means for synchronizing the phases of said driving step in dependence on said detecting step.

31. The integrated circuit of claim 30, further comprising a multiplexer which connects said sensing means to the disconnected one of said coil terminals.

32. The integrated circuit of claim 30, further comprising a sequencer which is operatively connected to be driven by the output of said masking means, and which is operatively connected to provide control signals for switching power transistors.

33. The integrated circuit of claim 30, wherein said driving means is connected to exactly three of said coil terminals.

\* \* \* \* \*